(12) United States Patent
Harrington

(10) Patent No.: US 6,480,958 B1
(45) Date of Patent: Nov. 12, 2002

(54) SINGLE-USE PASSWORDS FOR SMART PAPER INTERFACES

(75) Inventor: Steven J. Harrington, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/088,344

(22) Filed: Jun. 1, 1998

(51) Int. Cl.[7] .............................................. G06F 01/24
(52) U.S. Cl. ...................................... 713/184; 713/161
(58) Field of Search ................................ 713/161, 168, 713/170, 184, 200, 201, 202; 380/255, 264

(56) References Cited

U.S. PATENT DOCUMENTS

| | | | | |
|---|---|---|---|---|
| 5,557,677 A | * | 9/1996 | Prytz ........................... | 380/20 |
| 5,805,674 A | * | 9/1998 | Anderson Jr. ............ | 379/93.03 |
| 5,907,597 A | * | 5/1999 | Mark ...................... | 379/93.03 |
| 6,078,898 A | * | 6/2000 | Davis et al. .................. | 705/19 |

* cited by examiner

*Primary Examiner*—Thomas R. Peeso
(74) *Attorney, Agent, or Firm*—Fay, Sharpe, Fagan, Minnich & McKee, LLP

(57) ABSTRACT

A security control system for remote computers includes a first local input/output device for entering a user name and regular password. A password generator (10) returns a single-use password which is an encrypted combination of the user name, a representation of the regular password, and date and time information. A second local input device is used for entering the single-use password. A remote computer (50) receives the single-use password. The remote computer (50) has a cache (76) of previously received single-use passwords. The remote computer (50) compares the single-use password to the cache (76) of previously received single-use passwords. If there is a match further access is denied. Also included is a decryption key (78) which is used to regenerate the user name, the representation of the regular password, and the date and time information. If the date and time is older than a predetermined date and time threshold further access is denied. The remote computer (50) also compares the user name and the representation of the regular password to a stored list (86). If there is no match further access is again denied.

33 Claims, 2 Drawing Sheets

SINGLE-USE PASSWORDS FOR SMART PAPER INTERFACES

BACKGROUND OF THE INVENTION

The present invention relates to the art of password generation. It finds particular application in conjunction with single-use passwords for smart paper interfaces, and will be described with particular reference thereto. However, it is to be appreciated that the present invention is also amenable to other like applications where high levels of security are desired.

Smart paper or smart form techniques refer to techniques for communicating with electronic devices, such as computers, printers, copiers, and the like, with hard-copy instructions (i.e. instructions written on paper). Typically, the instructions are in the form of checked boxes, circled objects, carefully printed text, and/or other like schemes. Generally, the paper or other hard copy containing the instructions scanned or otherwise read, the user's marks are identified and interpreted, and the corresponding instructions are carried out. The technique is used to communicate with a remote device through a fax machine or other like device. The user's instructions are scanned and transmitted by the fax to the remote device that then identifies and interprets them. Commonly, the device's response is then sent back to the user through the same fax machine. This allows communication with a remote device without terminals, keyboards, workstations or local area networks.

However, in systems that provide access to information, it is advantageous to implement security measures in order to limit access to only those individuals who are authorized. Often data is personal, private, and/or otherwise sensitive and it is desirable to not have it openly available. Moreover, where the remote computer or device is being instructed to perform tasks, only those individuals authorized to operate it are to be granted access. A common approach to establishing access rights is through the use of a secret password and personal user name or identification number. The password is a sequence of characters that the authorized user alone knows and enters into the computer along with their user name or identification number. The computer then checks the password against that assigned to the user to verify authorization. One problem with using this scheme in smart paper applications is that the password would be written down. This greatly jeopardizes the systems security by potentially revealing otherwise secret passwords to unauthorized individuals. As an alternative, the password may be entered via the telephone buttons or numeric keypad as part of establishing the fax link. However, this would involve the establishment of a special connection protocol in every fax machine that was to be used. Generally, it is more desirous to use arbitrary conventional fax machines. It is therefore advantageous to send the authorization code on the smart paper along with the instructions.

The present invention contemplates a new and improved single-use password generator and security control system which overcomes the above-referenced problems and others.

SUMMARY OF THE INVENTION

In accordance with one aspect of the present invention, a security control system for remote computers is provided. It includes a first local input/output device for entering a user name and regular password. A password generator is accessed by the first local input/output device such that the password generator, in response to the user name and regular password, returns to the first input/output device a single-use password which is an encrypted combination of the user name, a representation of the regular password, and date and time information corresponding to the date and time the user name and regular password were entered. A second local input device is used for entering the single-use password. A remote computer which receives the single-use password includes a cache of previously received single-use passwords. The remote computer compares the single-use password to the cache of previously received single-use passwords. If there is a match further access to the remote computer is denied. Also included is a decryption key. The remote computer uses the decryption key to generate the user name, the representation of the regular password, and the date and time information from the single-use password. The remote computer compares the date and time generated by the decryption key to a predetermined date and time threshold such that if the date and time generated by the decryption key is older, further access to the remote computer is denied. Also included is a list of representations of regular passwords with corresponding user names. The remote computer compares the user name and the representation of the regular password generated from the decryption key to the list such that if there is no match further access to the remote computer is denied.

In accordance with a more limited aspect of the present invention, the first input/output device is a telephone and the password generator is remotely located.

In accordance with another aspect of the present invention, the user name and regular password are entered via a numeric keypad of the telephone.

In accordance with a more limited aspect of the present invention, the user name and regular password are entered verbally and are interpreted via voice recognition device included in the password generator.

In accordance with a more limited aspect of the present invention, the single-use password returned by the password generator is returned verbally.

In accordance with a more limited aspect of the present invention, the single-use password returned by the password generator is returned in hard-copy form via one of a fax and a printer.

In accordance with a more limited aspect of the present invention, the representations of the regular passwords are the same as the regular passwords.

In accordance with a more limited aspect of the present invention, the representations of the regular passwords are encrypted versions of the regular passwords.

In accordance with a more limited aspect of the present invention, the single-use password is entered by having the second local input device read the single-use password from a hard copy thereof.

In accordance with a more limited aspect of the present invention, the second local input device includes one of a fax machine and a scanner.

In accordance with another aspect of the present invention, a method of controlling access to a remote computer from a local device is provided. The method includes entering information including a user name and a regular password into a password generator.

The entered information is combined with date and time information to generate combined data. The combined data is encrypted to generate a single-use password. The single-use password is then input into the local device. It is then determined if the single-use password had been previously input. Access to the remote computer is denied if it is determined that the single-use password had been previously input. The single-use password is then decrypted to generate the combined data. If the date and time information from the combined data is older than a predetermined threshold, access to the remote computer is denied. It is next determined if the entered information from the combined data is valid and access to the remote computer is denied if the entered information is not valid. Access to the remote computer is granted if access is not otherwise denied.

In accordance with a more limited aspect of the present invention, the step of combining further includes encrypting the regular password prior to combining such that the combined data generated includes the entered user name and encrypted version of the entered regular password, and the date and time information.

In accordance with a more limited aspect of the present invention, the step of determining if entered information from the combined data is valid further includes comparing the entered user name and encrypted version of the regular password against a list of valid user names and corresponding valid encrypted versions of regular passwords.

In accordance with a more limited aspect of the present invention, the step of inputting further includes reading the single-use password from a hard copy thereof.

In accordance with a more limited aspect of the present invention, the step of determining if the single-use password had been previously input further includes comparing the single-use password against a cache of previously input single-use passwords.

In accordance with a more limited aspect of the present invention, those previously input single-use passwords which have time and date information older than the predetermined threshold are deleted from the cache of previously input single-use passwords.

In accordance with a more limited aspect of the present invention, the step of determining if entered information from the combined data is valid further includes encrypting the entered regular password to generate an encrypted version thereof. The entered user name and encrypted version of the regular password are then compared against a list of valid user names and corresponding valid encrypted versions of regular passwords.

In accordance with a more limited aspect of the present invention, the step of entering information further includes entering information via a telephone to a remote location housing the password generator.

In accordance with another aspect of the present invention, an access control system for remote devices is provided. It includes a first local input/output device for entering authorization information. A password generator is accessed by the first input/output device such that the password generator, in response to the authorization information, returns to the first input/output device a limited-use password which is an encrypted version of a combination of the authorization information with instance-dependent information. A second local input device is used for entering the limited-use password. An access controller receives the limited-use password. The access controller interprets and determines validity of the limited-use password such that access to a remote device is denied for invalid limited-use passwords.

In accordance with a more limited aspect of the present invention, the remote device is one of a printer, a copier, and a computer.

In accordance with a more limited aspect of the present invention, the limited-use password is entered by having the second input device read a hard copy thereof.

In accordance with a more limited aspect of the present invention, the second input device is one of a fax machine and a scanner.

In accordance with a more limited aspect of the present invention, the first input/output device is a computer and the password generator is locally located.

In accordance with a more limited aspect of the present invention, the first input/output device is a telephone and the password generator is remotely located.

In accordance with a more limited aspect of the present invention, the authorization information is entered via a numeric keypad of the telephone.

In accordance with a more limited aspect of the present invention, the authorization information is entered verbally and is interpreted via a voice recognition device included in the password generator.

In accordance with a more limited aspect of the present invention, the authorization information includes a user name and system password.

In accordance with a more limited aspect of the present invention, the instance-dependent information includes date and time information corresponding to a date and time when the authorization information is entered.

In accordance with a more limited aspect of the present invention, the encrypted version of the combination of the authorization information with the instance-dependent information is an encrypted version of a combination of the user name, an encrypted version of the system password, and the date and time information.

In accordance with a more limited aspect of the present invention, the access controller uses the date and time information to determine if the limited-use password is expired.

In accordance with a more limited aspect of the present invention, the limited-use password is valid for a single use and the access controller uses a cache of previously received limited-use passwords to determine if the limited-use password has already been entered.

In accordance with a more limited aspect of the present invention, the limited-use password is valid for a predetermined number of uses and the access controller uses a cache of previously received limited-use passwords to determine if the limited-use password has already been entered more than the predetermined number of times.

One advantage of the present invention is that it permits smart paper access to remote computers without breaching security measures and without employing special fax connection protocols.

Another advantage of the present invention is that non-authorized users are denied access to secured computers and/or information.

Another advantage of the present invention is that authorized users can employ their regular system passwords and user names without divulging them.

Another advantage is that the system can generate and communicate a single use password for secure data communications using arbitrary conventional fax machines.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps

DETAILED DESCRIPTION OF THE PERFERRED EMBODIMENTS

Figure 1:
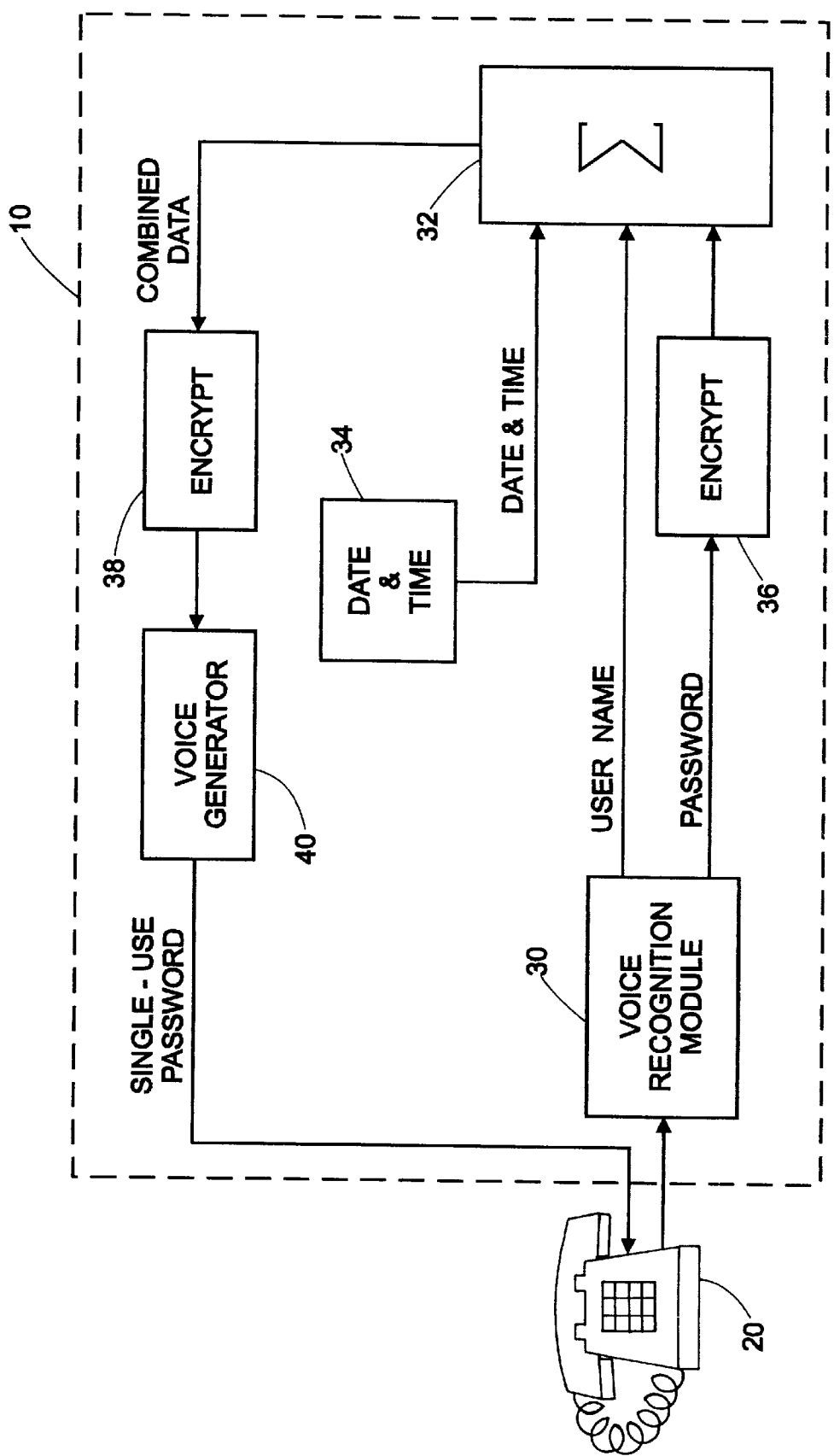
FIG. 1 is a diagrammatic illustration of a password generator in accordance with aspects of the present invention; and, FIG. 2 is a diagrammatic illustration of a remote computer with security control system in accordance with aspects of the present invention.

With reference to FIG. 1, a single-use password for smart paper applications is provided by a dial-in password service or it is generated by a local personal device such as a computer. In the case of the dial-in service, a user first connects to the dial-in password service and enters a secured identity or authorization information such as his user name or identification number and regular password. In response thereto, the service provides a single-use password to be included on a smart-paper document. The single-use password is constructed from a combination of the user name, regular password, and instance information such as the current date and time. The combined data is then encrypted to yield the single-use password. For increased security, the password service optionally first encrypts the incoming password before combining it with the user name and date and time, and then again encrypts the combination. This prevents the user's password from being known even after decryption of the combined data.

More specifically, the password service includes a remote password generator 10 which is accessed by a local input/output device such as a telephone 20 or other appropriate telecommunication apparatus. A user's user name or identification number and password are entered via the telephone 20. The password is generally a readily remembered string of characters assigned to the corresponding user name. Preferably, the password is the user's regularly used system password.

As illustrated, the user name and password are entered verbally and interpreted by a voice recognition module 30. In an alternative embodiment, no voice recognition module is employed and the user name and regular password are entered via the telephone's 20 numeric keypad. In any event, the user name and a representation of the regular password are combined in a combination processor 32 with current date and time information stored in a date and time register 34 to generate combined data. Preferably, the representation of the regular password is an encrypted version of the regular password generated by an optional encryption processor 36. In this manner, should later generated information (i.e. the combined data and/or other downstream output) be intercepted and transformed back into the component parts compiled by the combination process 32, the regular password remains encrypted and security is not breached. Alternately, the representation of the regular password is simply the regular password itself.

Ultimately, the combined data is input into another encryption processor 38 for further encryption. The output of the encryption processor 38 is the single-use password used on the smart paper document for gaining access to a remote device such as a computer, printer, copier or other like system. The single-use password is then relayed to the telephone 20 verbally via a voice generator 40 or otherwise returned as is appropriate for the input/output device being employed.

In an alternate embodiment, the voice generator 40 is omitted and the single-use password is returned in a hard-copy format via a fax, printer, or other like device.

Optionally, the password generator 10 is a local, hand held, and/or portable unit which a user can access as desired to generate single-use passwords. The local unit is additionally equipped with appropriate integrated input and output devices such as keypads and displays respectively.

In this manner, the invention herein provides a means of including authorizing information (i.e. the single-use password) in a hard-copy format or on paper for use in smart paper applications without compromising the user's password. The password generator 10 generates the single-use password from the user's permanent regular password. However, it is safe to openly include the single-use password on a smart paper document since it cannot be reused nor is the user's regular password discernable from the single-use password included on the smart paper.

Figure 2:
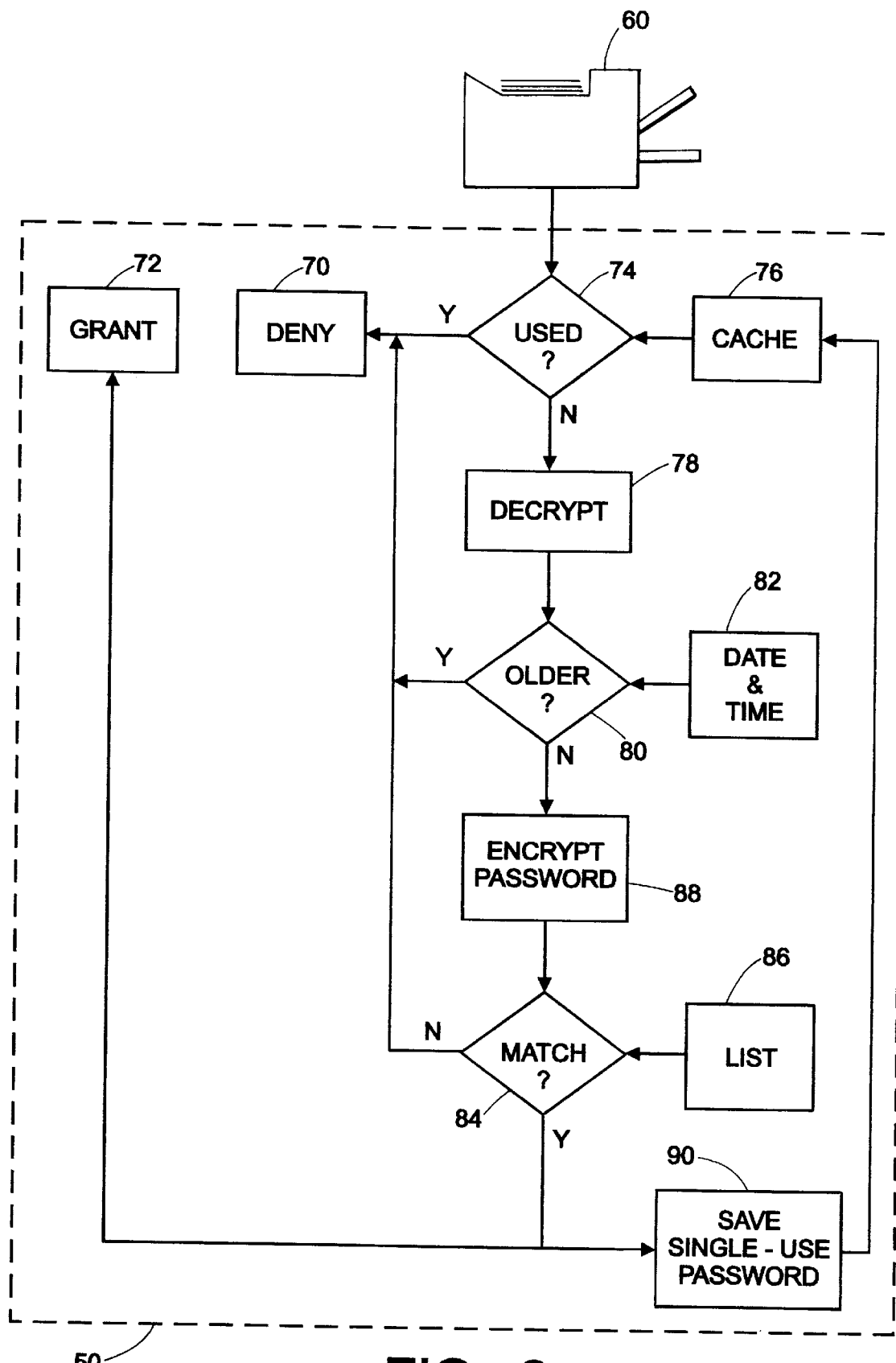

With reference to FIG. 2 and continuing reference to FIG. 1, when the single-use password is received, it is decrypted to obtain the user's user name or identification number, regular password (possibly encrypted), and date and time information. The receiving or access control system uses the date and time information to determine if the password has expired. It also keeps a cache of single-use passwords it has seen. This list is checked to be sure the single-use password is not used more than once. The single-use passwords need only be kept in the cache until the time at which they expire. The access control system can compare the user's regular password against a list of passwords to validate the user's access. Preferably, the system first encrypts the regular password (if not already done) and compares it to a list of encrypted passwords so that unencrypted passwords are never stored.

More specifically, the single-use password is input in hard-copy format along with other instructions and transmitted to a remote device 50 to which access is desired such as a computer, printer, copier or other like device. A second local input device such as a fax machine 60 or other appropriate device is employed to read the single-use password from its hard-copy format and transmit it to the remote device 50.

The remote device 50 identifies and interprets the transmission from the fax machine 60. A access controller utilizes the input single-use password to either deny 70 or grant 72 access to the remote device 50. Initially, a determination 74 is made as to whether or not the single-use password had been previously used. This is accomplished by comparing the single-use password against a cache 76 of previously input single-use passwords. Preferably, the cache 76 only stores previously entered single-use passwords that were validated or authenticated. In this manner, memory or storage space is conserved in that not all previously entered single-use passwords are saved (only the valid ones are saved). Invalid input single-use passwords are not stored as these are rejected anyway in the later stages of the security control process. Moreover, single-use passwords stored in the cache 76 which include date and time information that is older than a predetermined threshold are deleted therefrom. Again, memory or storage space is thereby conserved while maintaining protection from expired single-use passwords as they are rejected in a later stage of the security control process. In any event, if the determination 74 is that the single-use password had been used before, further access is denied 70, otherwise the access controller continues with the authentication process.

A decryption key 78 is utilized to transform the single-use password back into the combined data having the original components that made up the same. That is to say, the decryption key 78 regenerates the user name, regular password (optionally an encrypted version), and date and time information from the single-use password. A determination 80 is made whether or not the date and time information obtained from the single-use password is older than the predetermined date and time threshold (the same date and time threshold referred to above with regard to deletion of single-use passwords from the cache 76) which is stored in a date and time threshold register 82. If from the comparison, the determination 80 is made that the date and time is older than the threshold, then the single-use password is expired and further access is denied 70. If the single-use password is not expired, the authorization procedure continues.

A final determination 84 is made as to whether or not the regular password is valid for the user name. This is accomplished by comparing the data obtained from the single-use password against a list 86 of valid encrypted versions of the regular passwords with corresponding user names. An optional encryption processor 88 is employed to encrypt the regular password obtained from the single-use password in the case where it had not been previously encrypted prior to combination by the combination processor 32. In this manner, security is increased as the list 86 does not include discernable or actual representations of the regular passwords in memory, rather only encrypted versions of the regular password are stored. If the determination 84 is made that a match exists, then access is granted 72, otherwise access is denied 70. Moreover, when authenticated, the single-use password is saved 90 in the cache 76 to prohibit it from being reused.

In this manner, security of remote devices accessed by fax ("smart paper") is significantly enhanced through the use of single-use passwords written directly on the sending form. The single-use passwords are either locally generated using a personal device or obtained through telephone interaction with a password server. Enforcement of one-time and timely use increases security. Additionally, while described above with reference to separate components, the password generator 10 is optionally integrated with the remote device 50. Moreover, the entire access controller may be either separate from or integrated with the actual device to which access is sought. That is to say, it may be the remote device 50 itself to which the user seeks access. On the other hand, a remote computer may merely control access to yet another computer, printer, copier, automated system, or other like device to which access is ultimately being sought.

In addition, as opposed to being a single-use password system, the system may support limited-use passwords as desired. That is, the password generator is optionally configured to return a limited-use password, and the access controller configured to allow multiple uses of the limited-use password. In this case, the access controller checks to see if the limited-use password had been previously entered more than a predetermined number of times when determining whether or not to accept the limited-use password.

The invention has been described with reference to the preferred embodiments. obviously, modifications and alterations will occur to others upon a reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A security control system for remote computers comprising:
   a first local input/output device for entering a user name and regular password;
   a password generator accessed by the first local input/output device such that the password generator, in response to the user name and regular password, returns to the first input/output device a single-use password which is an encrypted combination of the user name, a representation of the regular password, and date and time information corresponding to the date and time the user name and regular password were entered;
   a second local input device for entering the single-use password; and,
   a remote computer which receives the single-use password, the remote computer having;
      a cache of previously received single-use passwords, wherein the remote computer compares the single-use password to the cache of previously received single-use passwords such that if there is a match further access to the remote computer is denied;
      a decryption key, wherein the remote computer uses the decryption key to generate the user name, the representation of the regular password, and the date and time information from the single-use password;
      a predetermined date and time threshold, wherein the remote computer compares the date and time generated by the decryption key to the predetermined date and time threshold such that if the date and time generated by the decryption key is older further access to the remote computer is denied; and,
      a list of representations of regular passwords with corresponding user names, wherein the remote computer compares the user name and the representation of the regular password generated by the decryption key to the list such that if there is no match further access to the remote computer is denied.

2. The security control system according to claim 1, wherein the first input/output device is a telephone and the password generator is remotely located.

3. The security control system according to claim 2, wherein the user name and regular password are entered via a numeric keypad of the telephone.

4. The security control system according to claim 2, wherein the user name and regular password are entered verbally and are interpreted via a voice recognition device included in the password generator.

5. The security control system according to claim 2, wherein the single-use password returned by the password generator is returned verbally.

6. The security control system according to claim 2, wherein the single-use password returned by the password generator is returned in hard-copy format via one of a fax and a printer.

7. The security control system according to claim 1, wherein previously entered single-use passwords are deleted from the cache when their date and time information is older than the predetermined date and time threshold.

8. The security control system according to claim 1, wherein representations of the regular passwords are the same as the regular passwords.

9. The security control system according to claim 1, wherein representations of the regular passwords are encrypted versions of the regular passwords.

10. The security control system according to claim 1, wherein the single-use password is entered by having the second local input device read the single-use password from a hard copy thereof.

11. The security control system according to claim 10, wherein the second local input device includes one of a fax machine and a scanner.

12. Method of controlling access to a remote computer from a local device comprising:
 (a) entering information including a user name and a regular password into a password generator;
 (b) combining the entered information with date and time information to generate combined data;
 (c) encrypting the combined data to generate a single-use password;
 (d) inputting the single-use password into the local device;
 (e) determining if the single-use password had been previously input;
  (i) denying access to the remote computer if it is determined that the single-use password had been previously input;
 (f) decrypting the single-use password to generate the combined data;
 (g) determining if the date and time information from the combined data is older than a predetermined threshold;
  (i) denying access to the remote computer if it is determine that the date and time information from the combined data is older than the predetermined threshold;
 (h) determining if entered information from the combined data is valid;
  (i) denying access to the remote computer if it is determined that entered information from the combined data is not valid; and,
 (i) granting access to the remote computer if access is not otherwise denied.

13. The method of claim 12, wherein the step of combining further includes:
 encrypting the regular password prior to combining such that the combined data generated includes the entered user name, an encrypted version of the entered regular password, and the date and time information.

14. The method of claim 13, wherein the step of determining if entered information from the combined data is valid further includes:
 comparing the entered user name and encrypted version of the regular password against a list of valid user names and corresponding valid encrypted versions of regular passwords.

15. The method of claim 12, wherein the step of inputting further includes:
 reading the single-use password from a hard copy thereof.

16. The method of claim 12, wherein the step of determining if the single-use password had been previously input further includes:
 comparing the single-use password against a cache of previously input single-use passwords.

17. The method of claim 16, further including:
 deleting from the cache of previously input single-use passwords those which have time and date information older than the predetermined threshold.

18. The method of claim 12, wherein the step of determining if enter information from the combined data is valid further includes:
 encrypting the entered regular password to generate an encrypted version thereof; and,
 comparing the entered user name and encrypted version of the regular password against a list of valid user names and corresponding valid encrypted versions of regular passwords.

19. The method of claim 12, wherein the step of entering information further includes:
 entering information via a telephone to a remote location housing the password generator.

20. An access control system for remote devices comprising:
 a first local input/output device for entering authorization information;
 a password generator accessed by the first input/output device such that the password generator, in response to the authorization information, returns to the first input/output device a limited-use password which is an encrypted version of a combination of the authorization information with instance-dependent information;
 a second local input device for entering the limited-use password; and,
 an access controller which receives the limited-use password, wherein the access controller interprets and determines validity of the limited-use password such that access to a remote device is denied for invalid limited-use passwords.

21. The access control system according to claim 20, wherein the remote device is one of a printer, a copier, and a computer.

22. The access control system according to claim 20, wherein the limited-use password is entered by having the second input device read a hard copy thereof.

23. The access control system according to claim 22, wherein the second input device is one of a fax machine and a scanner.

24. The access control system according to claim 20, wherein the first input/output device is a computer and the password generator is locally located.

25. The access control system according to claim 20, wherein the first input/output device is a telephone and the password generator is remotely located.

26. The access control system according to claim 25, wherein the authorization information is entered via a numeric keypad of the telephone.

27. The access control system according to claim 25, wherein the authorization information is entered verbally and is interpreted via a voice recognition device included in the password generator.

28. The access control system according to claim 20, wherein the authorization information includes a user name and system password.

29. The access control system according to claim 28, wherein the instance-dependent information includes date and time information corresponding to a date and time when the authorization information is entered.

30. The access control system according to claim 29, wherein the encrypted version of the combination of the authorization information with the instance-dependent information is an encrypted version of a combination of the user name, an encrypted version of the system password, and the date and time information.

31. The access control system according to claim 30, wherein the access controller uses the date and time information to determine if the limited-use password is expired.

32. The access control system according to claim 20, wherein the limited-use password is valid for a single use and the access controller uses a cache of previously received limited-use passwords to determine if the limiteduse password has already been entered.

33. The access control system according to claim 20, wherein the limited-use password is valid for a predetermined number of uses and the access controller uses a cache of previously received limited-use passwords to determine if the limited-use password has already been entered more than the predetermined number of times.

* * * * *